Jan. 26, 1965    M. H. PELAVIN    3,167,377
DIGITAL READ-OUT APPARATUS
Filed July 5, 1962    2 Sheets-Sheet 2
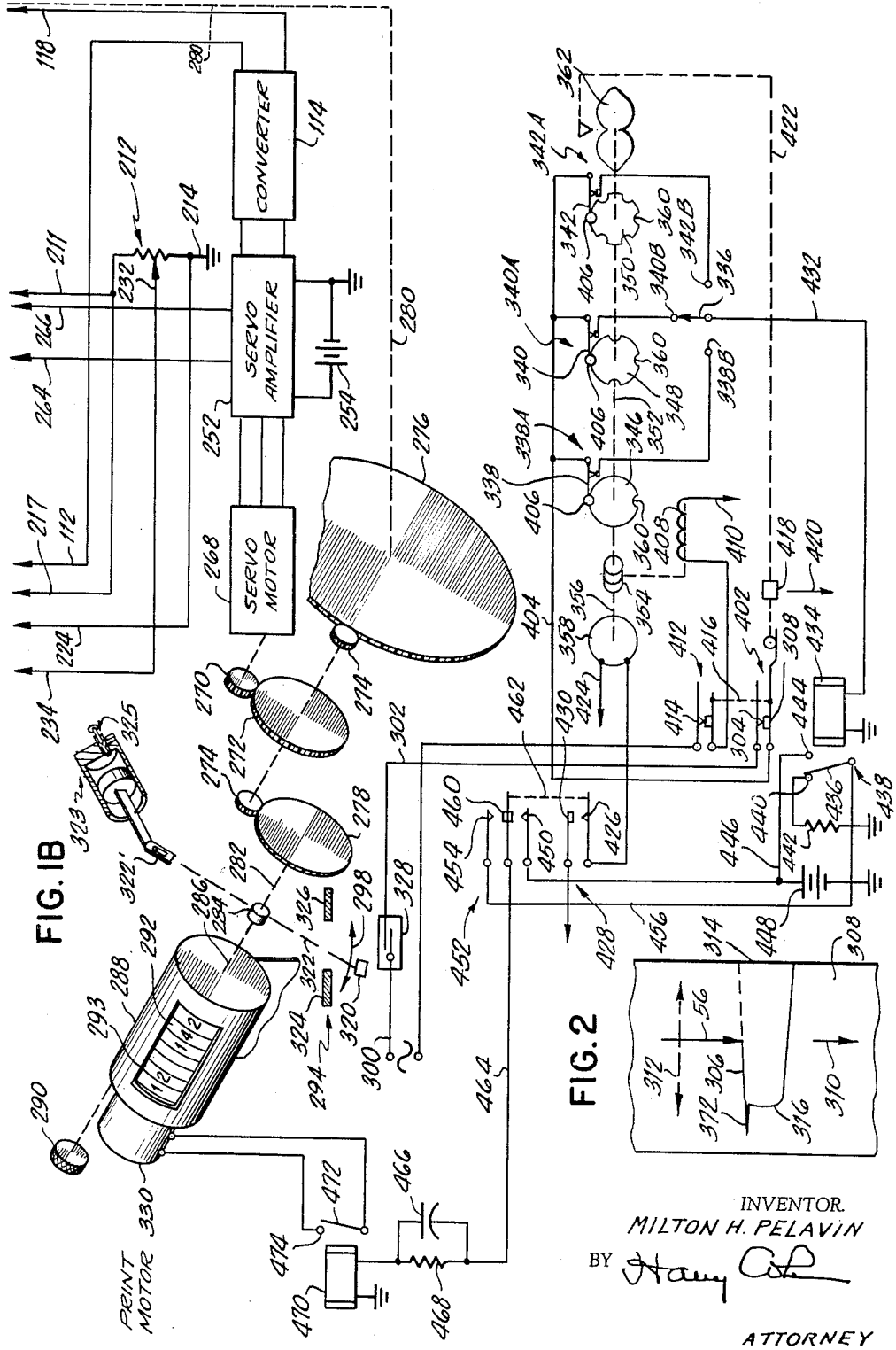
INVENTOR.
MILTON H. PELAVIN
BY Harry Cohen
ATTORNEY

United States Patent Office 3,167,377
Patented Jan. 26, 1965

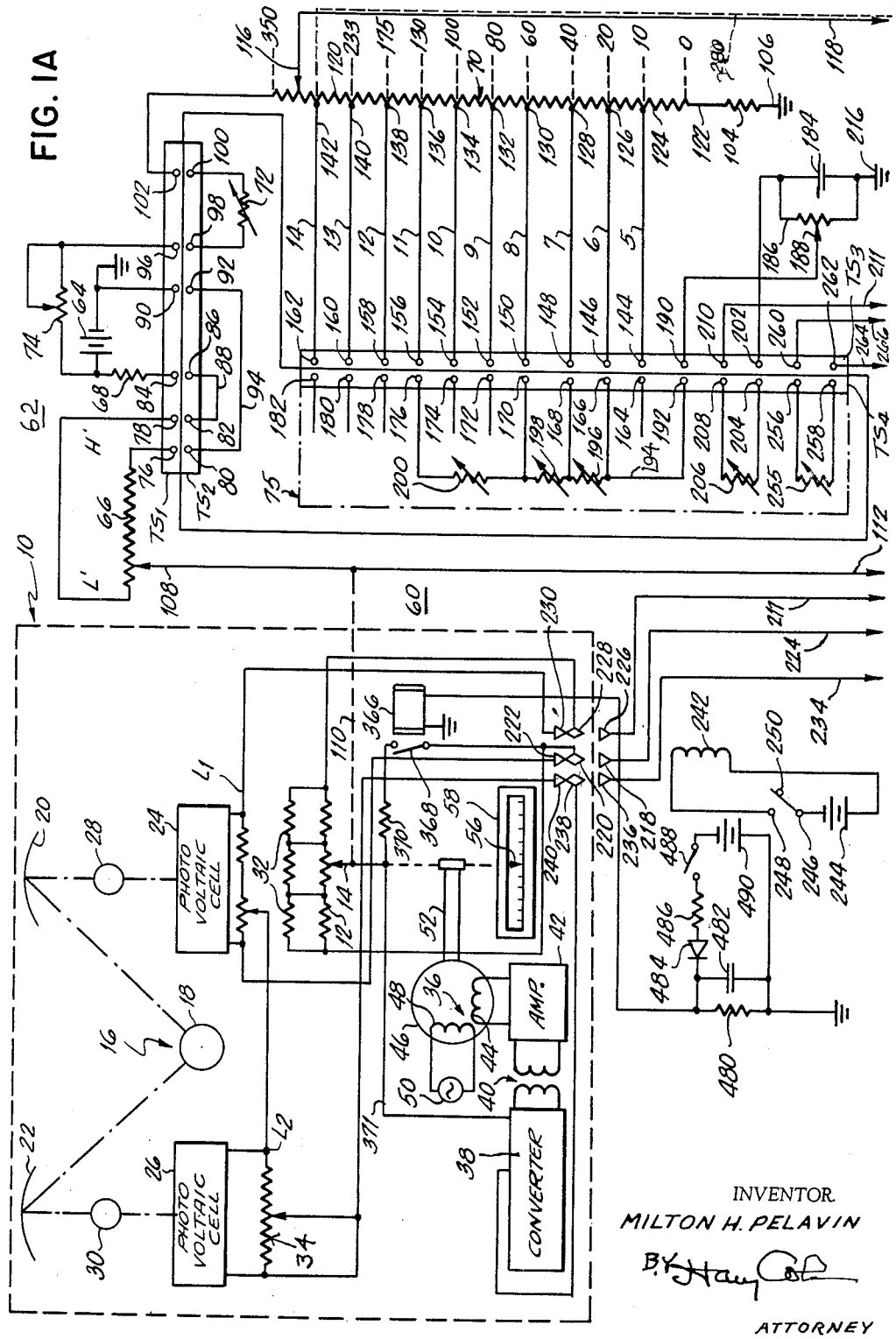

3,167,377
DIGITAL READ-OUT APPARATUS
Milton H. Pelavin, Greenburgh, N.Y., assignor to Technicon Instruments Corporation, Chauncey, N.Y., a corporation of New York
Filed July 5, 1962, Ser. No. 207,653
20 Claims. (Cl. 346—14)

The present invention relates generally to recording apparatus and particularly to recording apparatus to provide a visual indication or a recording of the numerical values of constituents of fluids under analysis.

In my prior patent, No. 2,960,910, dated November 22, 1960, there is disclosed an apparatus to provide direct readings, and permanent recordings, of the numerical values representative of concentrations of various constituents for which analyses are being conducted by means of a colorimeter, wherein the light transmission values of the various fluids under test are representative of said concentrations. Although said light transmission values for the different fluids vary in a non-linear or logarithmic manner, as set forth in Beer's law, said apparatus provides a linear recording thereof, as well as a direct reading and permanent record of said numerical values.

It is an object of the present invention to provide a generally improved apparatus for directly indicating on a recorder numerical values which are representative of the concentration of the constituent for which the analysis is being conducted, and for permanently recording said values, as by a printing operation.

It is another object of the present invention to provide an apparatus of the described type of simplified construction and increased efficiency.

It is another object of the present invention to provide means for quickly checking the operation of the apparatus to insure accurate printout of the recordings.

It is a further object of the present invention to provide means for obtaining a simple, efficient and accurate calibration of the apparatus for both high and low concentrations without the necessity of engaging in the time consuming procedure of resetting the calibration at each end after the calibration at the other end is reset.

It is a still further object of the present invention to automatically compensate for non-linearities in response curves due to the chemistry involved in particular test procedures.

The above and other objects, features and advantages of the present invention will be more fully understood from the following description considered in connection with the accompanying illustrative drawings.

In the drawings which illustrate the best mode presently contemplated for carrying out the invention:

FIGS. 1A and 1B taken together in side-by-side disposition illustrate a combined block diagram and schematic illustration of a recording apparatus pursuant to the present invention; and FIG. 2 illustrates a graph type recording of the type made by the recorder in the apparatus of the present invention.

Referring now to the drawings in detail, there is shown a measuring system or apparatus 10 of the type illustrated and fully described in my previously identified prior patent. Said system is of the type wherein a slidewire 12 is operated for balancing a null-type measuring circuit, which includes the loops L1 and L2, and wherein a recording or trace of the type illustrated in FIG. 2 is made of the movable arm or tap 14 of the slidewire.

The measuring system 10 includes a colorimeter 16 which, as here shown, may be constituted by a single light source 18, a pair of light reflectors 20 and 22, and a pair of photo voltaic cells 24 and 26, the outputs of which are applied to loops L1 and L2, respectively. A holder or container 28 for a standard or reference material, for example an optical filter, is interposed in the light path between the reflector 20 and cell 24, and a flow cell 30 with a companion optical filter for a sample liquid under test, is interposed in the light path between reflector 22 and cell 26. Portions of the outputs across the slidewire 12 in loop L1, linearized by resistors 32, and potentiometer 34 in loop L2, are applied to a balancing system 36 which includes a vibrating reed converter 38 coupled by a transformer 40 to an amplifier 42. The output of the amplifier is applied to one phase winding 44 of a two phase motor 46, the other winding 48 thereof being energized by the A.C. source 50. The shaft 52 of the motor drives the slidewire tap 14 to balance the measuring circuit and the shaft also drives the stylus 56 of a recorder 58 so as to record the movements of the tap 14 and produce traces of the type shown in FIG. 2, in the manner fully described in detail in the above mentioned patent.

Pursuant to the present invention, the linear transmission-concentration relationship of the tap 14, in effecting the various measurements, due to the presence of the shunts 32, are converted into numerical values which can be presented either visually or which can be printed on a tape or the like, or both types of presentation, namely visual and printed, may be simultaneously provided. This is accomplished through the utilization of the apparatus shown in FIGS. 1A and 1B, other than the null-type measuring system 10, said apparatus being generally designated by the reference numeral 60.

The apparatus 60 includes a null-type balancing system, generally indicated by the reference numeral 62. Said balancing system includes a voltage source 64 across which there is connected a first branch constituted by a retransmitting potentiometer 66 in series with a resistor 68 and a second branch constituted by a receiving potentiometer 70 in series with a variable resistor 72 and a rheostat 74. More specifically, as here shown, provision is made for a plug-in unit 75 by means of which connections are made to the receiving potentiometer 70 to linearize the system due to deviations from Beer's law relationship. The illustrated connections in the plug-in unit are utilized in connection with measuring the concentration of albumin in the fluids being analyzed in the colorimeter 10. Other plug-in units may be utilized for measuring other constituents, for example and not by way of limitation, blood, urea, nitrogen, etc. However, in lieu of plug-in units 75, it is within the scope of the present invention to utilize permanent wiring connections in combination with suitable switching arrangements so as to provide the different wiring arrangements that may be required for the tests for different constituents in the fluids being analyzed. In this connection it will be understood that due to the particular chemistry involved in the tests for different substances, for example and not by way of limitation, blood, urea, nitrogen, glucose, calcium, etc., there may be non-linearities present in the response curves for tests of various of these substances. These non-linearities are different from those involved in Beer's law, for which purpose slidewire 12 is linearized. The utilization of plug-in units permits for the automatic correction for the non-linearities in the test curves by providing for the tests for a particular substance a plug-in unit which has been compensated in advance for such linearities as hereinafter described. Moreover, it will be understood that in lieu of linearizing slidewire 12 for the purposes of Beer's law, it is within the scope of the present invention to linearize either the retransmitting slidewire 66 or the receiving potentiometer 70 in the same manner as slidewire 12.

In the illustrated embodiment, the slidewire potentiometer 66 is connected to plugs 76 and 78 of terminal strip TS1 which are engaged with jacks 80 and 82, respectively, on terminal strip TS2 in the unit 75. The positive terminal of the voltage supply 64 is connected through resistor 68 to plug 84 on terminal strip TS1 which in turn is connected to jack 86 on strip TS2. A jumper 88 interconnects jacks 82 and 86. The grounded terminal of supply 64 is connected to plug 90 on strip TS1 which, in turn, is connected to the jack 92 on strip TS2. Jacks 80 and 92 are interconnected by jumper 94. Where necessary to provide the proper polarity for a particular test, the connections of plugs 76 and 78 to jacks 80 and 82 may be reversed.

Rheostat 74 is connected between the positive terminal of source 64 and plug 96 on strip TS1. Said plug is connected to jack 98 on strip TS2. The variable resistor 72 is connected between jacks 98 and 100 on strip TS2 and jack 100 is connected to plug 102 on strip TS1. Plug 102 is connected to one end of the potentiometer 70, the other end of which is connected to one end of a resistor 104, which is grounded, as at 106.

From the foregoing, it will be apparent that the retransmitting slidewire 66 and the receiving potentiometer 70 are connected in parallel branches across supply 64. The branch provided with potentiometer 70 also includes rheostat 74 and variable resistor 72. Rheostat 74 is utilized for high calibration of the readout, and resistor 72 is utilized as a range adjustment control for the readout, as hereinafter explained.

Tap 108 on the slidewire 66 is ganged with tap 14 on the colorimeter slidewire 12, as indicated by the reference numeral 110 so that the tap 108 duplicates the variations or movements of the tap 14 whereby slidewire 66 functions as a retransmitting slidewire so as to transmit to the balancing system 62 voltage variations which are representative of concentrations of constituents in the fluids being analyzed in the colorimeter. Tap 108 is connected by wire 112 to the converter 114, which is similar to the converter 38, so as to apply said voltage variations to the converter.

Potentiometer 70, in the present embodiment, is a helical potentiometer provided with the tap 116 which is connected by wire 118 to the converter 114, so as to apply voltages to the latter in accordance with movements of tap 116. Consequently, it will be apparent that the converter 114 receives, as input signals, error voltages constituted by the differences in the voltages at taps 108 and 116.

In the illustrated form of the invention, the apparatus is set to provide a maximum numerical value of 350. For this purpose, potentiometer 70 is provided with a series of calibrated taps between its upper end 120 which represents a count of 350 and its lower end 122 which represents a count of zero. The taps 124, 126, 128, 130, 132, 134, 136, 138, 140 and 142 represent counts of 10, 20, 40, 60, 80, 100, 130, 175, 233 and 280, respectively. Said taps are connected to plugs 144, 146, 148, 150, 152, 154, 156, 158, 160 and 162, respectively, on terminal strip TS3 which are connected to jacks 164, 166, 168, 170, 172, 174, 176, 178, 180 and 182, respectively, on terminal strip TS4 in the plug-in unit 75. Jacks 164, 172, 174, 178, 180 and 182, which are here shown as being unconnected to the circuit, are available for use in connection with constituents other than albumin, for which the illustrated plug-in unit 75 is utilized, as one example of the various analyses for which the present invention can be utilized.

In order to provide for low calibration adjustment of the colorimeter 10, provision is made for a low voltage source 184 across which there is connected the potentiometer 186 having a tap 188 connected to plug 190 on strip TS3, which is connected to jack 192 on strip TS4. A jumper 194 interconnects jacks 166 and 192. A first variable resistor 196 interconnects jacks 168 and 166. A second variable resistor 198 interconnects jacks 168 and 170. A third variable resistor 200 interconnects jacks 170 and 176. By these connections, the voltage at movable tap 188 is applied between ground and one of the fixed taps 126 of potentiometer 70. Tap 126 is utilized in the test for albumin, while one of the taps 128, 130 and 136 is utilized for each of several other conventional tests. Resistors 196, 198 and 200 are pre-set or adjusted in the plug-in unit to provide for automatic compensation or correction for non-linearity, due to the chemistry involved in a particular test, in the calibration curve between low and high calibration values. The tap 188 is adjusted to provide for a low calibration adjustment, as hereinafter explained.

The low voltage supply 184 is also used to adjust the position of stylus 56 of recorder 58. For this purpose, the positive end of supply 184 is connected to plug 202 which is connected to jack 204. A variable resistor 206 interconnects jacks 204 and 208, the latter being connected to plug 210, which is connected by lead 211 to one end of variable resistor 212, the other end of which is grounded, as at 214. Since supply 184 is also grounded, as at 216, said supply is connected across resistors 206 and 212, in series. The lower end of resistor 212 is connected by lead 224 to a fixed relay contact 218, engageable by movable relay contact 220 which is normally engaged with fixed relay contact 222 to close the circuit for loop L1 of the colorimeter at the high constituent concentration end of slidewire 12. The upper end of potentiometer 212 is connected by wire 217 to fixed relay contact 226, engageable with movable relay contact 228 which is normally engaged with fixed relay contact 230 to close the circuit for loop L1 at the low constituent concentration end of slidewire 12. Movable tap 232 of potentiometer 212 is connected by wire 234 to fixed relay contact 236, engageable by movable relay contact 238 which is normally engaged with fixed relay contact 240 to close the circuit between loop L2 and converter 38. Said movable relay contacts are operable in response to the energization of solenoid 242 during calibration of the colorimeter. For this purpose, provision is made for a voltage supply 244 having one end connected to the solenoid and the other to a switch 246 movable between a calibration position, at contact 248, and a reset or normal open position at 250, as illustrated. When switch 246 is closed at 248 for calibration of the apparatus, solenoid 242 is energized to disengage contacts 238, 220 and 228 from contacts 240, 222 and 230, respectively. This disconnects the colorimeter 16 from the apparatus 60 to permit for the application of calibration voltages to the apparatus 60. By adjusting resistor 206, the calibration level of the recorder 58 can be varied. More specifically, resistor 206 is adjusted to adjust the voltage level to the recorder so that the slidewire voltage of slidewire 12 is set to an equivalent slidewire potential during normal colorimeter operation. In calibrating the apparatus, the low point is first established by the adjustment of tap 188 of potentiometer 186 connected to the low voltage source 184, and after this low point is established, the high point is established by varying the current by resistance adjustment as above described. The provision of the low voltage source 184 and the adjustment of tap 188 for establishing the low point before the high point is established enables the high point to be established without disturbing the calibration for the low point. More specifically, for the low calibration adjustment, a low impedance is used in that resistor 206 is a relatively low resistance, for example 50 ohms and tap 188 is adjusted to inject a relatively low calibration voltage to the lower end of the receiver potentiometer. As here shown, voltage source 184 is a relatively low voltage source, for example 6 volts, and a portion of said voltage is applied from tap 188 to tap 126 of the receiver potentiometer. The resistance of tap 188 to ground is very low compared to the receiver potentiometer resistance, and therefore the resistance from tap 126 to ground will be lowered as well. Now when resistor 70 is calibrated for the high level concentration by varying rheostat 74, any change in current through the receiver potentiometer 70 will cause a corresponding change in voltage at all points above this tap 126; but the voltage at tap 126 will remain at the value set by tap 188 of potentiometer 186. Consequently there will be no appreciable effect on the low calibration adjustment.

As previously indicated, the converter 114 receives error voltage signals from slidewire 66 and helical potentiometer 70 via leads 112 and 118. The output of the converter is applied to a servo amplifier 252 which is energized by voltage source 254, which is preferably non-regulated. The gain of the amplifier may be varied by means of the gain control resistor 255 connected across jacks 256 and 258 which are connected to plugs 260 and 262, respectively. Said plugs are connected to the amplifier circuit by wires 264 and 266, respectively. The output of the amplifier is applied to a two pole servo motor 268. The motor shaft drives a gear 270 which is in mesh with a gear 272. The latter drives a gear 274 which is in mesh both with a gear 276 and a gear 278. Gear 276 is ganged, as indicated by reference numeral 280, to the movable tap 116 of helical potentiometer 70. The shaft 282, to which gear 278 is keyed, is suitably coupled to the shaft 286 of a printing counter 288. The printing counter may be of any suitable conventional type, such as described in my prior patent, and is provided with a manual reset knob 290.

As previously indicated, the maximum numerical value, representative of constituent concentration, is 350 in the present embodiment. Consequently, the gear ratios are such that ten revolutions of tap 116 of the helical potentiometer are equal to thirty-five revolutions of the counter shaft 286.

In view of the foregoing, it will be apparent that the movements of tap 14 during the balancing of the measuring system 36 in the colorimeter 10 are reproduced by the tap 108 for applying signals to the converter 114 to operate the motor 268 for driving gear 274 so as to drive gear 276 for varying tap 116 which also applies a signal to the converter 114. Gear 274 continues to operate until the null-type balancing system 62 is balanced when there is no error voltage applied to the converter. Gear 274 also causes rotation of the counter shaft 286 during the balancing operation to provide a numerical indication, or digital readout, at 292 in the printing counter, which, at balance, is representative of the numerical value of the concentration of the constituent for which the analysis is being made. The printing counter also indicates the particular test number, as at 293, so that the maximum reading for each individually identified test is indicated.

Referring now to FIG. 2 in detail, there is shown a typical trace 306 recorded by stylus 56 on the record medium 308 as the latter moves in the direction of arrow 310, the stylus moving transversely of the direction of movement of the record medium, as indicated by the arrows 312. The base 314 of the trace 306 represents 100 percent light transmittance and the top 316 represents maximum concentration, as the fluid sample flows through the flow cell 30.

Pursuant to a feature of the present invention, provision is made to obtain an automatic printing of the value corresponding to the peak sample and standard concentration, by printing at the top 316 of each trace or record 306. For this purpose, provision is made for a peak detector circuit, generally indicated by reference numeral 294. As here shown, the peak detector circuit or device 294 includes a rod or holder 322 which is carried by a slip clutch 284 mounted on shaft 286, as indicated at 296, so that rod 322 will reverse, as shown by arrow 298, in response to the reversing rotary movements of the shaft. Holder 322 mounts a permanent magnet 320, so that the magnet movements are representative of the movements of the stylus 56, movement of the magnet toward the left, viewing FIG. 1B, being representative of a downscale movement of the stylus toward the left, viewing FIG. 2. The movement of the magnet holder 322 is limited by the fixed detents or stops 324 and 326 which are disposed in the path of movement of the holder so as to be limited substantially to the extent of the peak 316. Clutch 284 slips on shaft 286 so that the turning motion of said shaft is not interfered with by the stops 324. A magnetic switch 328 of a well known type is disposed relative to said detents so as to be energized by the magnet shortly after the stylus 56 changes its direction of movement from the left to the right viewing FIG. 2. It will be apparent that the stylus begins to move to the right downwardly from the peak 316 of the trace 306. It will be apparent that the magnetic switch 328 opens or closes according to the direction of rotation of shaft 286. The switch closes when the stylus 56 starts its downscale movement from the peak 316 of the trace in response to the corresponding movement of magnet 320. The arm 322' of holder 322 is connected to a dash pot 323 in order to retard the movement of said holder so that it does not move rapidly if "noise" occurs while the stylus of the recorder begins to move in the direction of decreasing values of the trace on the chart paper. Said dash pot is provided with a control valve 325. One end of switch 328 is connected to one terminal of a power source, or by lead 300. The other end is connected by lead 302 to contact 304 of switch 402. Said contact is normally closed with contact 308 which is connected to line 404. Line 404 is connected to the movable contacts 338, 340 and 342 of normally closed microswitches which are operated by cams 346, 348 and 350, respectively. The cams are mounted in a common shaft 352, which also mounts a reset cam 362, the function of which will presently appear. Said cams are utilized to determine the number of tests to be made per hour by the colorimeter apparatus. For this purpose cam 346 has two cam falls 360, cam 348 has four cam falls 360 and cam 350 has six cam falls 360, corresponding to 20, 40 and 60 tests per hour, respectively. Each microswitch has a cam follower 406 which, when engaged in a fall 360 of the associated cam, retains the associated microswitch normally closed, each switch being open when its follower is not engaged in a cam fall. Switches 338A, 340A and 342A are respectively connected to stationary contacts 338B, 340B and 342B of a test selector switch having a movable contact 336 which is selectively engageable therewith for 20, 40 or 60 tests per hour. Shaft 352 is coupled to shaft 356 of motor 358 by means of a magnetically operated clutch 354 operated by a solenoid 408, the clutch being engaged when the solenoid is energized. One end of the solenoid is connected, as at 410, to one terminal of a power source, the other end thereof being connected to the other terminal of the power source as by switch 412 having a movable contact 414 which is ganged, as indicated by reference numeral 416, to the movable contact 308 of switch 402. A manually operable push button 418, when depressed, as indicated by arrow 420, is effective to open both switches 402 and 412. Push button 418 is also effective to operate the double heart-shaped cam 362, as indicated by reference numeral 422 to reset 346, 348 and 350 to their switch-closed positions. Motor 358 is connected at one end 424 to one terminal of a power source and is connected at its other end to the movable contact 426 of a manual switch 428 which has a stationary contact 430 connected to the other power supply terminal for the motor 358.

The movable contact of selector switch 336 is connected by lead 432 to one end of a solenoid 434, the other end of which is grounded. The solenoid operates the movable contact 436 of a switch 438. Contact 436 is normally engaged with contact 440 which is connected to ground through a resistor 442. When the solenoid is energized, contact 436 engages contact 444 which is connected by lead 446 to power source 448 which is also connected to a stationary contact 450 of switch 452. Said switch has a stationary contact 454 connected by lead 456 to movable contact 436 of relay 438. Switch 452 has a manually operable contact 460 which is ganged, as indicated at 462, to movable contact 426 of switch 428. Movable contact 460 is connected by lead 464 to condenser 466 connected in parallel to resistor 468, both of which are connected to one end of a relay solenoid 470, the other end of which is grounded. When the solenoid is energized, it closes contacts 472 and 474 which are connected to the conventional print motor 330.

The peak detector print circuit operates as follows: When switch 328 is closed in response to the reverse movement of the stylus as it begins its downscale movement, the microswitches 338A, 340A and 342A are each connected to one terminal of a power source through closed switches 402 and 328. Depending upon the setting of selector switch arm 336, the associated microswitch is connected to line 432 when it is closed by its associated follower 406 being engaged in a cam fall 360 of its associated cam. When a microswitch is closed relay solenoid 434 is energized since one end of it is connected through the closed microswitch and closed switches 402 and 328 to a source of power. Relay 434 now closes contacts 436 and 444 to connect supply 448 to contact 454 of switch 452. Assuming that said switch has been manually operated to its automatic printing position, in which its contacts 454 and 460 are closed, a voltage pulse is applied to the R-C circuit 466, 468 which keeps relay 470 energized for approximately one-half second so as to close contacts 472–474 for a sufficient period to energize the print motor 330 to print the peak reading 292 and test number 293 then shown on the counter, this being effected by conventional printing mechanism. It will be apparent that when switch 452 is closed in its automatic position, switch 428 is also closed in its automatic position at contacts 426–430, since said switches are ganged. With switch 428 closed in said position, motor 358 is energized since it is connected to a power source, as at 424 and 430. The motor operates the cams 346, 348 and 350 to provide for the selected number of tests. The peak detector printing arrangement can also be manually operated for checking purposes. This is done by closing switch 452 at contacts 450–460 and simultaneously opening the ganged switch 428. This connects source 448 directly to the R-C circuit 466 and 468 to operate the print motor.

The printing cycle is re-set after each calibration when the first test comes through. For this purpose, switch 452 is set in its center position, ganged switch 428 being in its open position. Button 418 is depressed. The first portion of the inward movement of the button opens both ganged switches 402 and 412 to de-energize clutch solenoid 408 and open clutch 354. Continued inward movement of the button operates reset cam 362 so as to reset cams 346, 348 and 350 to their initial start positions, as illustrated.

Provision is also made to indicate the moment of each printing by a corresponding pip 372 on the graph 306. For this purpose a normally open relay switch 368 in series with a resistor 370 is connected between the low end of slidewire 12 in the colorimeter and a lead 371 extending from the slidewire tap 14 and converter 38. A relay solenoid 366 therefor has one end grounded and the other end connected through lead 364 to a circuit which includes the R-C circuit 480–482, rectifier 484, resistor 486, a normally open switch 488 and a power source 490. Switch 488 is located in counter 288 and conventional mechanism is provided to close switch 488 whenever the print motor 330 is operated. This causes a pulse to be applied across the R-C network which is utilized to momentarily energize solenoid 366 to momentarily close switch 368 to momentarily unbalance the balanced system 36 so as to provide the pip 372.

In order to calibrate the instrument, first a known low and a known high concentration value are sent through the analyzer and the tracing obtained on the recorder. The unknown samples may then follow in sequence after the first low and high standards.

Immediately after the second standard peak occurs on the recorder (high concentration value) relay 242 is energized by closing switch 246. The recorder stylus will now respond to the setting of the potentiometer 212 instead of following the colorimeter. The recorder pen position is adjusted by tap 232 to the same value it reached for the low standard concentration value. Tap 188 is adjusted so that the numbers shown in the counter at 292 correspond to the low concentration value in concentration units directly.

The recorder pen is now adjusted by tap 232 of potentiometer 212 to correspond to the high standard value. Rheostat 74 is adjusted until the numbers in the counter read the high concentration value. Switch 250 is now opened and the recorder pen will respond to the colorimeter. This calibration of the low and high points occurs before the first unknown sample peak occurs.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

I claim:

1. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison balancing circuit operable to an unbalanced condition thereof in response to said output, means operable to balance said first circuit, a second balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, and means operable in response to the operation of said second circuit balancing means to provide a print of the count substantially at the maximum concentration of said constituent.

2. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison balancing circuit operable to an unbalanced condition thereof in response to said output, means operable to balance said first circuit, a second balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, and means operable in response to the operation of said second circuit balancing means to obtain a signal substantially at the maximum concentration of said constituent in the sample for energizing a printing means.

3. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison balancing circuit operable to an unbalanced condition thereof in response to said output, means operable to balance said first circuit, a second balancing circuit operable to an unbalanced condition thereof in response to the operation of said first circuit balancing means, means to balance said second circuit, counter-means operable in response to said second circuit balancing means to provide a numerical count representative of the concentration of a predetermined constituent of said sample, means operable in response to the operation of said second circuit balancing means to obtain a signal substantially at the maximum concentration of said constituent in the sample for energizing a printing means, and means to obtain on said recording a record of the energization of said printing means.

4. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison null-type balancing circuit operable to an unbalanced condition thereof in response to said output, means operable to balance said first circuit, means operable in response to said first circuit balancing means to provide a recording of the light transmittance through a sample under test, a second null-type balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, peak detector means operable by said second circuit balancing means through movements which are responsive to the balancing operation of said second balancing means, and means responsive to said peak detector means to obtain a signal substantially at the maximum concentration of said constituent in the sample for energizing a printing means.

5. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison null-type balancing circuit operable to an unbalanced condition thereof in response to said output, means operable to balance said first circuit, means operable in response to said first circuit balancing means to provide a recording of the light transmittance through a sample under test, a second null-type balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, a circuit having means to supply a signal for energizing a printing means, and means operable by said second circuit balancing means through movements which are responsive to the balancing operation of said second balancing means for energizing said signal supply circuit substantially at the maximum concentration of said constituent in the sample.

6. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison null-type balancing circuit operable to an unbalanced condition thereof in response to said output, means operable to balance said first circuit, means operable in response to said first circuit balancing means to provide a recording of the light transmittance through a sample under test, a second null-type balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, a circuit having means to supply a signal for energizing a printing means, means operable by said second circuit balancing means through movements which are responsive to the balancing operation of said second balancing means for energizing said signal supply circuit substantially at the maximum concentration of said constituent in the sample, said last mentioned circuit comprising magnetic switch means in circuit between a voltage source and pulse generating means, said means operable by said second circuit balancing means including magnetic means operable to energize said magnetic switch means substantially at said maximum concentration of said constituent to provide a signal to said pulse generating means.

7. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison null-type balancing circuit operable to an unbalanced condition thereof in response to said output, means operable to balance said first circuit, means operable in response to said first circuit balancing means to provide a recording of the light transmittance through a sample under test, a second null-type balancing circuit operable to an unbalanced condition thereof in response to the operation of said first circuit balancing means, means to balance said second circuit, counter means operable in response to said second circuit balancing means to provide a numerical count respresentative of the concentration of a predetermined constituent of said sample, a circuit having means to supply a signal for energizing a printing means, means operable by said second circuit balancing means through movements which are responsive to the balancing operation of said second balancing means for energizing said signal circuit substantially at the maximum concentration of said constituent in the sample, said last mentioned circuit comprising magnetic switch means in circuit between a voltage source and pulse generating means, said means operable by said second circuit balancing means including magnetic means operable to energize said magnetic switch means substantially at said maximum concentration of said constituent to provide a signal to said pulse generating means, said last mentioned circuit including selector means for energizing said magnetic switch means for a predetermined number of energizations during a predetermined time interval.

8. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison null-type balancing circuit operable to an unbalanced condition thereof in response to said output, means operable to balance said first circuit, recorder means operable in response to said first circuit balancing means to provide a recording of the light transmittance through a sample under test, a second null-type balancing circuit operable to an unbalanced condition thereof in response to the operation of said first circuit balancing means, means to balance said second circuit, counter means operable to provide a numerical count representative of the concentration of a predetermined constituent of said sample, means operable to energize a printing means to provide a print substantially at the maximum concentration of said constituent, and means for operating said recorder to obtain on said recording a record of the energization of said printing means.

9. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison balancing circuit operable to an unbalanced condition thereof in response to said output, means operable to balance said first circuit, a second balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, means for calibrating said apparatus for maximum concentration of said constituent, means for calibrating said apparatus for minimum concentration of said constituent, and means to minimize mutual interaction of said calibration means.

10. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison balancing circuit operable to an unbalanced condition thereof in response to said output, means operable to balance said first circuit, a second balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, said first balancing circuit including a first potentiometer for developing a voltage in response to concentration of said constituent in the sample and a slidewire potentiometer operable to balance said first circuit, and said second circuit including a transmitter slidewire potentiometer operable in response to the operation of said first slidewire potentiometer to unbalance said second balancing circuit and a receiver potentiometer operable to balance said second balancing circuit to provide said numerical count, and means to linearize said receiver potentiometer to compensate for non-linearity in the analysis of said sample.

11. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison balancing circuit operable to an unbalanced condition thereof in response to said output, means operable to balance said first circuit, a second balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, said first balancing circuit including a first potentiometer for developing a voltage in response to concentration of said constituent in the sample and a slidewire potentiometer operable to balance said first circuit, and said second circuit including a transmitter slidewire potentiometer operable in response to the operation of said first slidewire potentiometer to unbalance said second balancing circuit and a receiver potentiometer operable to balance said second balancing circuit to provide said numerical count, and means to linearize one of the potentiometers of said second balancing circuit to compensate for non-linearity in the analysis of said sample.

12. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison balancing circuit operable to an unbalanced condition thereof in response to said output, means operable to balance said first circuit, a second balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, said first balancing circuit including a first potentiometer for developing a voltage in response to concentration of said constituent in the sample and a slidewire potentiometer operable to balance said first circuit, and said second circuit including a transmitter slidewire potentiometer operable in response to the operation of said first slidewire potentiometer to unbalance said second balancing circuit and a receiver potentiometer operable to balance said second balancing circuit to provide said numerical count, and means to linearize one of the potentiometers of said second balancing circuit to compensate for non-linearity in the analysis of said sample, said linearizing means being provided in a plug-in device for said apparatus.

13. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison balancing circuit operable to an unbalanced condition thereof in response to said output, means operable to balance said first circuit, a second balancing circuit operable to an unbalanced condition thereof in response to the operation of said first circuit balancing means, means to balance said second circuit, counter means operable in response to said second circuit balancing means to provide a numerical count respresentative of the concentration of a predetermined constitutent of said sample, means for calibrating said apparatus for maximum concentration of said constituent, and means for calibrating said apparatus for minimum concentration of said constituent, the low calibration setting being unaffected by the high calibration operation.

14. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a first comparison balancing circuit operable to an unbalanced condition thereof in response to said output, means operable to balance said first circuit, a second balancing circuit operable to an unbalanced condition thereof in response to the operation of said first circuit balancing means, means to balance said second circuit, counter means operable in response to said second circuit balancing means to provide a numerical count representative of the concentration of a predetermined constituent of said sample, means for calibrating said apparatus for maximum concentration of said constituent, means for calibrating said apparatus for minimum concentration of said constituent, and said low calibration means being of low resistance in relation to said high calibration means whereby the low calibration setting is unaffected by the calibration for maximum concentration.

15. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a comparison null-type balancing circuit operable to an unbalanced condition thereof in response to said output, means operable to balance said circuit, counter means operable in response to said balancing means to provide a numerical count representative of the concentration of a known constituent in the liquid under analysis, means for calibrating said apparatus for maximum concentration of said constituent, and means for calibrating said apparatus for minimum concentration of said constituent, the low calibration setting being unaffected by the high calibration operation.

16. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a comparison null-type balancing circuit operable to an unbalanced condition thereof in response to said output, means operable to balance said circuit, counter means operable in response to said balancing means to provide a numerical count representative of the concentration of a known constituent in the liquid under analysis, means for calibrating said apparatus for maximum concentration of said constituent, means for calibrating said apparatus for minimum concentration of said constituent, and said low calibration means being of low resistance in relation to said high calibration means, whereby the low calibration setting is unaffected by the calibration for maximum concentration.

17. In a colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a comparison null-type balancing circuit operable to an unbalanced condition thereof in response to said output, means operable to balance said circuit, counter means operable in response to said balancing means to provide a numerical count representative of the concentration of a known constituent in the liquid under analysis, peak detector means operable by said balancing means through movements which are responsive to the balancing operation of said balancing means, and means responsive to said peak detector means to obtain a signal substantially at the maximum concentration of said constituent, and means responsive to said signal to provide a numerical print of the maximum concentration value of said constituent.

18. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a comparison null-type balancing circuit operable to an unbalanced condition thereof in response to said output, means operable to balance said circuit, counter means operable in response to said balancing means to provide a numerical count representative of the concentration of a known constituent in the liquid under analysis, peak detector means operable by said balancing means through movements which are responsive to the balancing operation of said balancing means, means responsive to said peak detector means to obtain a signal substantially at the maximum concentration of said constituent, means responsive to said signal to provide a numerical print of the maximum concentration value of said constituent, and recorder means separate from said print means to provide a chart recording of said peak printing operation.

19. In colorimetric analysis apparatus which include holding means for liquid samples under analysis, means to transmit light through said samples, and means to measure the intensity of the thusly transmitted light and provide an output indicative thereof in accordance with the concentration of a predetermined constituent of the samples; analysis-result recording means comprising, a comparison null-type balancing circuit operable to an unbalanced condition thereof in response to said output, means operable to balance said circuit, counter means operable in response to said balancing means to provide a numerical count representative of the concentration of a known constituent in the liquid under analysis, said balancing means including a potentiometer, and means to linearize said potentiometer to compensate for non-linearity in the analysis of the sample.

20. In colorimetric analysis apparatus which include holding means for liquid samples under analysis, means to transmit light through said samples, and colorimeter means to measure the intensity of the thusly transmitted light and provide an output indicative thereof in accordance with the concentration of a predetermined constituent of the sample; analysis-result recording means comprising a first comparison balancing circuit operable to an unbalanced condition thereof in response to said output, means to balance said first circuit, recorder means operable in response to the operation of said balancing means to provide a chart recording of light transmittance through the liquid under analysis, a second balancing circuit operable to an unbalanced condition thereof in response to the operation of said balancing means, means to balance said second circuit, counter means operable in response to said second circuit balancing means to provide a numerical count representative of the concentration of a predetermined constituent of said sample, and means operable in response to the operation of said second circuit balancing means to obtain a signal substantially at the maximum concentration of said constituent in the sample for energizing a printing means, and means for calibrating said recorder independently of said colorimeter.

References Cited in the file of this patent
UNITED STATES PATENTS
2,960,910     Pelavin _____ Nov. 22, 1960